(No Model.)
J. W. BURROUGHS.
VELOCIPEDE.
No. 324,749. Patented Aug. 18, 1885.
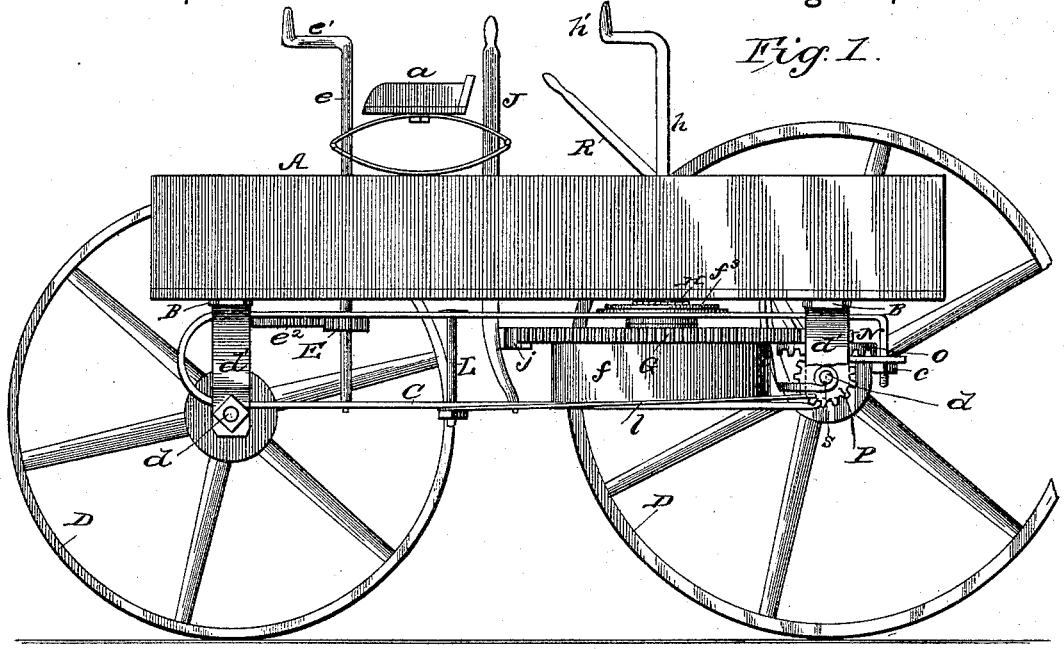
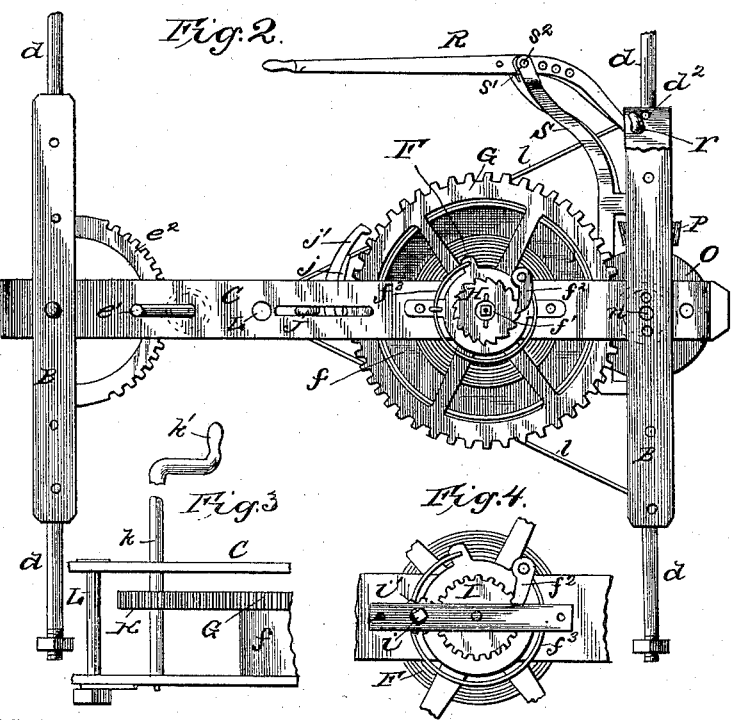
WITNESSES:
Fred. G. Dieterich
Jesse Middleton
INVENTOR:
J. W. Burroughs
BY Munn & Co
ATTORNEYS.

United States Patent Office.

JOHN WESLEY BURROUGHS, OF SALT LAKE CITY, UTAH TERRITORY.

VELOCIPEDE.

SPECIFICATION forming part of Letters Patent No. 324,749, dated August 18, 1885.

Application filed February 16, 1885. (No model.)

*To all whom it may concern:*

Be it known that I, JOHN WESLEY BURROUGHS, a citizen of the United States, residing at Salt Lake City, in the county of Salt Lake, Utah Territory, have invented certain new and useful Improvements in Self-Propelling Vehicles, of which the following is a description.

Figure 1 is a side elevation of my self-propelling vehicle with two of the wheels removed. Fig. 2 is a plan view of the same, with the wood-work of the carriage and the driver's seat removed, so as to show the mechanism underneath the carriage. Fig. 3 is a side elevation showing a modification in the brake mechanism. Fig. 4 is a plan view showing a modification of the mechanism for winding up the driving-spring.

My invention relates to vehicles which are adapted to be propelled upon common roads by the power derived from a coiled steel spring which unwinds as the vehicle moves along.

My invention consists in the detailed construction and combination of the parts hereinafter described.

I will now proceed to describe my invention with reference to the accompanying drawings, in which similar letters of reference indicate corresponding parts in all the figures.

A is the wood-work framing of a carriage provided with a seat, $a$, for the driver, and mounted upon the two cross-pieces, B, either directly, as shown in the drawings, or with springs between them to lessen the shock and jar.

C is a frame for the driving mechanism. This is made in one piece, bent double in the form as shown in Fig. 1, and provided with the nut $c$ for securing the ends of it together. The cross-pieces B, which carry the carriage, are attached to the frame C at each end of it.

D are the wheels upon which the vehicle runs, fastened upon the axles $d$, carried by brackets $d'$, provided with axle-bearings $d^2$, and attached to the frame C.

E is a pinion mounted on the vertical shaft $e$, provided with a crank-handle, $e'$, for guiding the vehicle. Pinion E engages with the toothed segment $e^2$, which is securely attached to the bracket $d'$, in which the front axle is journaled.

F is a spring contained in a suitable box, $f$. The outer end of this spring is attached to the driving-wheel G, the inner end being fastened to the central vertical shaft, $f'$.

H is a ratchet-wheel fastened upon the vertical shaft $f'$, and provided with a pawl, $f^2$, which is pressed into contact with the said ratchet-wheel by means of the spring $f^3$. The end of shaft $f'$ is made square, and a key, $h$, is provided, having a crank-handle, $h'$, for winding up the spring. Sometimes, instead of attaching the key $h$ directly to the shaft $f'$, I secure the wheel I upon the said shaft, and secure the key $h$ to the square end of a short vertical shaft, $i$, on which is fastened the pinion $i'$. The pinion $i'$ engages with the wheel I, and enables the spring to be wound up with greater ease than when the key $h$ is applied directly to the shaft $f'$.

J is the brake-lever pivoted in the lower part of the frame C, and provided with the brake-block $j$, the pressure of which against the circumference of wheel G is sufficient to regulate the motion of the vehicle. The brake-lever J is also provided with the catch $j'$. A slight turn of the said lever is sufficient to cause this catch to engage with the teeth of wheel G and hold the vehicle stationary.

Sometimes, instead of using the lever J and brake-block $j$, I prefer to use the modification shown in Fig. 3. This consists of a pinion, K, mounted upon a vertical shaft, $k$, and gearing into the teeth of wheel G. The shaft $k$ is provided with a crank-handle, $k'$, and the motion is regulated by that. When necessary, the motion of the vehicle can be increased by turning the handle $k'$.

L is a distance-piece for supporting the frame C. $l$ are braces connecting the ends of the bracket carrying the rear wheels with the frame C. The driving-wheel G gears into the pinion N, which is secured on a short vertical shaft, $n$, journaled in the frame C. A bevel spur-wheel, O, is also fastened on the shaft $n$, and turns with it. The rear axle $d$ is made to slide in the journals which carry it, and on it are keyed two bevel-pinions, P, either of which can be slid into gear with the bevel-wheel O, but are arranged at such a distance apart upon the shaft that either one of them must be moved out of gear with the bevel-wheel O before the opposite one can enter.

R is a hand-lever pivoted at $r$ in the bracket which supports the axle.

S is a rod provided with eyes $s$, which encircle the axle behind the bevel-pinion P, and with the double eye $s'$ and pin $s^2$ for attaching it to the lever R, by the movement of which the axle is slid back and forth in its bearings, carrying the bevel-pinions with it, and causing the vehicle to have a backward or forward motion, as desired.

I do not confine myself to the use of a vehicle as shown, as the mechanism by which such vehicle is propelled is applicable to all wagons, carriages, and carts, and especially to "express" and "delivery" wagons which carry light loads.

Having thus described my invention, what I claim as new, and desire to secure by Letters Patent, is—

1. In a self-propelling vehicle, the combination of the brake-lever J, provided with the brake-block $j$ and catch $j'$, with the driving-wheel G for stopping the motion of the machinery, substantially as shown and described.

2. In a self-propelling vehicle, the combination of the spring F, ratchet-wheel H, provided with the pawl $f^2$ and spring $f^3$, the driving-wheel G, pinion N, bevel-wheel O, bevel-pinions P, and rear axle $d$ for driving the vehicle, substantially as shown and described.

JOHN WESLEY BURROUGHS.

Witnesses:
T. W. STEWART,
S. EWING.